Jan. 29, 1957  F. W. WAHLIN  2,779,478
TAPERED STRAINER AND ASSEMBLIES
Filed May 4, 1954
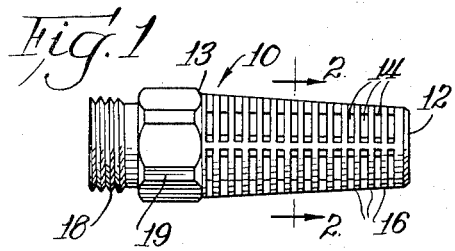
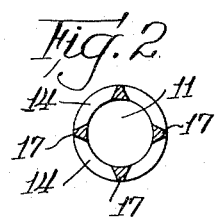
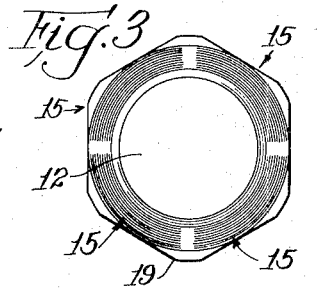
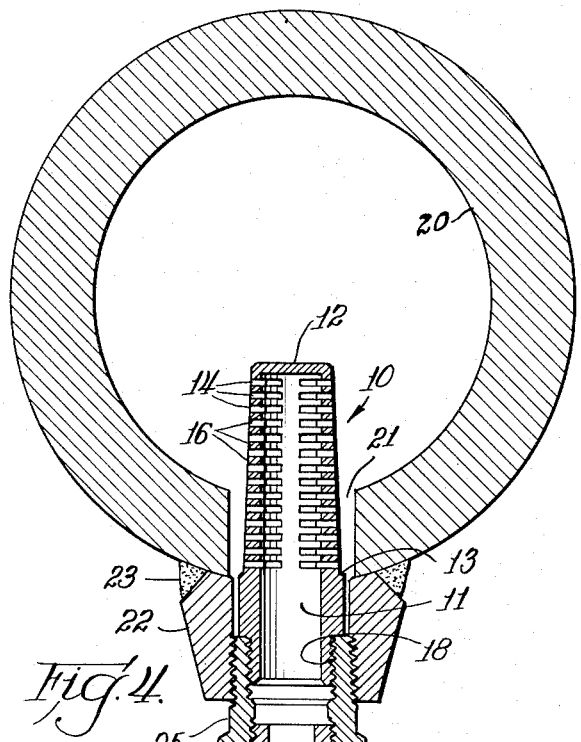
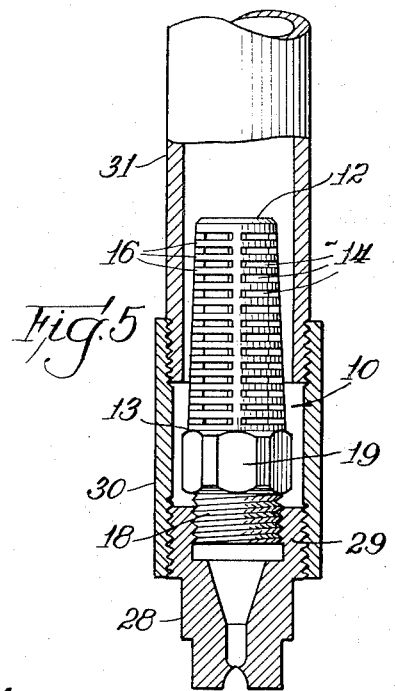
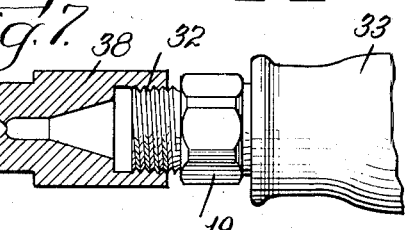
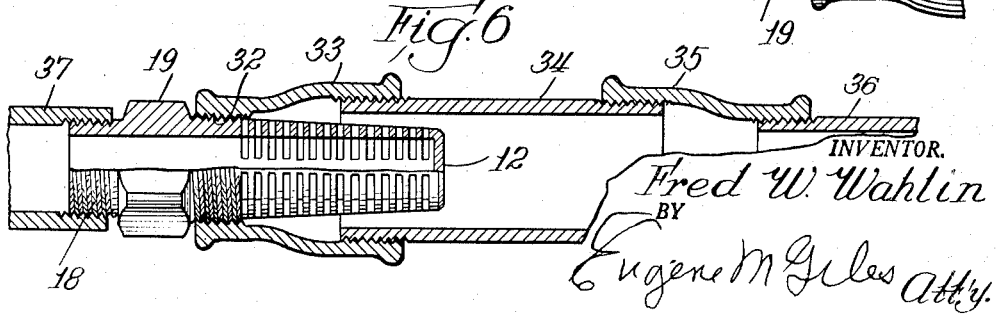
INVENTOR.
Fred W. Wahlin
BY
Eugene M. Giles Atty.

United States Patent Office 2,779,478
Patented Jan. 29, 1957

2,779,478

TAPERED STRAINER AND ASSEMBLIES

Fred W. Wahlin, Kane County, Ill., assignor to Spraying Systems Co., Bellwood, Ill., a corporation Application May 4, 1954, Serial No. 427,539

2 Claims. (Cl. 210—170)

This invention relates to strainers of the type employed with spray nozzles or for similar purposes, wherein the strainer is of elongated tubular shape adapted to be inserted endwise through a relatively small opening or into a relatively small tubular chamber, and has reference more particularly to a strainer of tapered shape with side wall openings spaced apart lengthwise thereof, and to mounting facilities by which such strainer is conveniently usable in various assemblies, this application being a continuation in part of my copending application Serial No. 293,400, filed June 13, 1952, now Patent No. 2,681,829.

Strainers of the type to which this invention relates are commonly used with spray nozzles of precision types for producing a spray of a particular shape and coverage requiring exactitude of spray performance.

Inasmuch as precision of spray shape and uniformity of spray coverage is greatly affected, and especially at high pressures, by unevenness of stream flow to the orifice of the nozzle, it is important that the strainer through which liquid is supplied to the orifice be accurately centered with respect to the passage leading to the orifice and designed to assure equalized confluence of liquid through the strainer to the place where the liquid heads toward the orifice and equalized or balanced flow from that place through the passage to the orifice.

Such strainers were usually made with a strainer screen mounted on a body, the body being of hollow cylindrical shape closed at one end and open at the other end and secured at the open end by a flange or end threading at the entrance to and in line with the passage to the nozzle orifice and the screen being of cylindrical shape and telescoped on the cylindrical body over openings in the side wall of the latter so that the liquid supplied to the nozzle orifice passed through the strainer screen and through the openings in the side wall of the screen supporting body into the interior of the latter and therefrom through the passage to the orifice.

Prior to the invention of my aforesaid copending application, the openings in the side wall of the cylindrical screen supporting body were customarily in the form of slots extending lengthwise of the body at intervals therearound, and when the strainer was inserted in a cylindrical chamber through which liquid was supplied in a direction lengthwise of the strainer body, the flow through the lengthwise openings in the side wall of the body was likewise lengthwise thereof. By reason of this lengthwise flow, wide or improper spacing of the side wall openings or obstruction of the strainer screen at any place therearound caused differential or unbalanced flow of parts of the stream flowing through the passage to the orifice and interfered with the desired accuracy and perfection of the spray.

In accordance with the invention of my said copending application, the strainer body is provided with circumferentially extending slots or slits at intervals throughout the strainer portion of the body which not only distribute the flow into the interior of the body more evenly therearound but avoid any lengthwise flow through the strainer into the interior of the body so that differential or unbalanced flow is avoided in the passage from the strainer to the orifice. Moreover, the circumferential slots or slits may be made sufficiently narrow to serve as the strainer medium and thereby dispense with the strainer screen.

It is a particular feature of the invention of this application that the strainer portion of the body is tapered from the closed end thereof to a larger size at the other end and has the openings through the side wall at spaced intervals lengthwise thereof and in accordance with this invention the strainer body is also preferably provided at the large end of the tapered strainer portion thereof with a place for wrench engagement therewith and with threaded mounting facilities at one or both sides of the place of wrench engagement.

The principal objects of this invention are to provide an improved strainer body; to arrange the openings through the side wall of the strainer so the entrances thereto are stepped in the direction of the length of the strainer portion thereof; to provide improved mounting facilities for the strainer body; to adapt the strainer for diversified mounting; and to provide a variety of useful assemblies thereof, these and other objects being accomplished as pointed out more particularly hereinafter and as shown in the accompanying drawing, in which:

Fig. 1 is a side view of a strainer body made in accordance with this invention;

Fig. 2 is a cross sectional view of the strainer body of Fig. 1 taken on the line 2—2 of Fig. 1;

Fig. 3 is an enlarged view looking at the small right hand end of the strainer body of Fig. 1;

Fig. 4 is a cross sectional view of a pipe or header having an opening through the side wall in which the strainer of Fig. 1 is inserted and secured as part of a nozzle assembly;

Fig. 5 is a view, partly in section, showing another mounting of the strainer of Fig. 1 in conjunction with a nozzle;

Fig. 6 is a view, partly in section, showing a modification of the strainer and an assembly thereof with conventional pipe fittings and pipe parts; and Fig. 7 shows a fragmentary left hand end portion of Fig. 6 with a nozzle tip secured to the strainer body in place of the piece of pipe which is shown at that place in Fig. 6.

Referring to the drawing, the strainer of Figs. 1, 2, 3 and 4, which is indicated as a whole at 10, comprises a body of elongated tubular form with a central cylindrical bore or opening 11 which is open at one end and closed at the other end, as indicated at 12. The strainer portion of the length of said body which extends from the closed end 12 to the location indicated by the reference numeral 13 is externally tapered as shown from a smaller diameter at the closed end 12 to a larger diameter at the other end 13 and the surrounding tapered wall thereof is provided therearound with a number of corresponding and equally spaced longitudinally extending rows of longitudinally spaced circumferentially extending slits 14, these rows being indicated by the reference numeral 15 in Fig. 3. Preferably, an even number of rows of slits is provided, four being shown in the illustrated strainer body, as a better balance of flow into the central opening 11 is obtained therewith.

The slits 14 are preferably quite narrow so as to serve as the straining medium, and the slits of each row are in close proximity to one another with a narrow width 16 of wall remaining therebetween, so that there is a relatively large number of slits in each row providing a relatively large total area of flow therethrough. Moreover, these slits 14 are preferably made by circular cutters of sufficiently small diameter and the adjoining rows 15 arranged sufficiently close to one another so that there is only a small substantially triangular portion 17 (see Fig. 2) of stock between the adjoining ends of the corresponding slits 14 of the adjoining rows. Thus there is only a narrow interval between the adjoining ends of each corresponding four circumferential slits and accordingly each corresponding four circumferential slits provides substantially a continuous entrance around the body to the central bore or opening 11 thereof.

The wall of the strainer portion of the body is of substantial thickness and as the bore or opening 11 is cylindrical, the thickness of the wall increases from the small closed end 12 to the larger end 13 thereof, and as the slits 14 are in diametrical planes, it is assured that the direction of flow through the slits 14 into the central opening 11 is perpendicular to the axis of the said opening 11 and accordingly there is no liquid entering the bore or opening 11 at any place therearound in a direction toward the open end of the bore or opening 11.

For mounting the strainer body 10 said body is preferably externally threaded, as indicated at 18, at the open end of the bore or opening 11 and provided between the threading 18 and the large end 13 of the slitted strainer portion of the body with a conventional hexagonal part 19 for wrench engagement therewith for screwing the strainer body into a holder. Obviously the strainer may be internally threaded at the open end of the bore 11 if desired, and with such end threading, either external or internal, and the part 19 to which a wrench is applicable, the strainer is adaptable for mounting in various operative assemblies.

Because of the thickness of its wall and the circumferential slitting thereof, it is capable of operating under high pressures and may, for example, be employed in connection with a spray nozzle for descaling hot metal in rolling mills where water is sprayed thereon at pressures as high as 1200 pounds per square inch.

Fig. 4 shows a mounting of the strainer which may be employed for this purpose, in which said figure the reference numeral 20 shows in cross section a thick walled pipe or header through which water is supplied to a series of nozzles, one only of which is shown in Fig. 4, through which the water is discharged under exceedingly high pressure at high velocity onto the surface of the sheet to be descaled, the pipe being provided at appropriate intervals along the length thereof with openings 21 each of which has a nipple 22 welded, as at 23, to the pipe or header 20 at the opening 21 to provide an external continuation thereof which is internally threaded for attachment of the nozzle thereto.

The nozzle in this instance does not have a special nozzle body such as that disclosed in my aforesaid copending application, but instead comprises a nozzle tip 24 which is externally threaded at the inner end and secured in the internally threaded outer end of pipe bushing or packing gland like connector 25 which is externally threaded at the inner end and secured in the internally threaded outer end of the nipple 22.

This nozzle tip has a central passage 26 leading outwardly from the inner end thereof at the outer end of which is an orifice 27 through which the spray is discharged as is well known in the art.

The inner end of the connector 25 is internally threaded and the threaded end 18 of the strainer 10 is secured therein so that the strainer is concentric with the passage 26 of the nozzle tip 24 and it is to be noted that the strainer 10 is thus a part of the nozzle assembly which is removable and insertable as a unit at the threaded engagement of the connector 25 with the nipple 22.

A portion of the length of the slitted strainer part of the strainer 10 is concentrically located in the pipe opening 21 which provides an annular chamber therearound through which the water reaches the slits 14 therein and as the slitted portion of the strainer body is tapered, the annular space therearound within the opening is of progressively reduced size outwardly which tends to supply the water evenly to all of the slits 14 within the opening 21.

Moreover, the flow of water around the strainer is generally outward in the direction of the length and increasing diameter of the slitted strainer portion, and especially in the opening, and because of the tapered form of the strainer, the entrances of the slits 14 are stepped, in the direction of the length of the strainer, radially outward and facilitates entrance of the thus flowing liquid to the slits and contributes uniformity of flow thereto.

It is also to be noted that the slits 14 are of substantial depth so that the liquid entering therein is directed substantially perpendicularly to the longitudinal axis of the opening 11 in the strainer body and that those slits 14 nearest the open end of the body 10 and the nozzle tip 24 are of increased depth so that the above mentioned perpendicular flow is more positive at those places. This depth of the slits also provides depth of stock between the slits to readily withstand the high pressure at which the liquid is supplied through the slots.

Another convenient and illustrative form of assembly in which the above described strainer may be employed is shown in Fig. 5 in which a nozzle tip 28, similar to that of Fig. 4, is employed but with an enlarged externally threaded inner end 29 which may be secured in the outer end of a pipe coupling 30 which is secured at the other end onto the end of a pipe 31, the nozzle tip being internally threaded at its inner end for threaded engagement therewith of the outer threaded end 18 of the strainer 10 as part of the nozzle assembly, and removable with the latter from the coupling 30.

With this Fig. 5 arrangement, conventional pipe and pipe fittings may be employed to make up the spraying equipment with the simple nozzle tip and strainer assembly and because of the tapered form of the strainer a smaller pipe may be employed and, moreover, an annular space is provided throughout the length of the strainer portion of the strainer body 10 and which tapers throughout substantially the entire length of the slitted portion of the strainer in the direction of flow to the slits.

A nozzle tip 28 similar to that of Fig. 5 may be employed with the assembly of Fig. 4 in place of the nozzle tip 24 and connector 25 thereof so that the nozzle tip is secured directly to the nipple 22, and it will be observed that the provision of the strainer with the wrench engageable part 19 adjacent to the mounting threading of the strainer is particularly advantageous in making up the assemblies of Figs. 4 and 5 and also the assemblies of Figs. 6 and 7 hereinafter described.

As shown in Figs. 6 and 7, the strainer may be made with a threading 32 between the wrench fitting part 19 and the slitted strainer portion thereof so that the strainer itself may be mounted in the fitting as part of the facilities through which liquid is supplied thereto.

Thus, in the Figs. 6 and 7 assemblies the strainer is secured by the threading 32 in the outer small end of an ordinary pipe reducer 33 which is secured at the other end to a piece 34 of ordinary pipe which may be of short length and provided at the other end with another reducer 35 to which a smaller supply pipe 36 is connected.

Thus the reducer 33 and short length 34 of pipe provides a barrel of appropriate size to accommodate the slitted end of the strainer and provides a suitable annular space around the latter to supply the liquid lengthwise of the slitted portion of the strainer body and uniformly therearound.

The outer end of the strainer may have an external threading 18 like that of the strainer of Figs. 1, 2, 3, 4 and 5 and this assembly may be incorporated at an intermediate place in a pipe line by connecting a lead away pipe 37 to the threaded end 18 or a spray nozzle tip 38 may be secured on the threaded end 18, as shown in Fig. 7. Obviously the outer end of the strainer may be internally threaded, if desired, to receive a nozzle, pipe or other attachment therein, instead of externally threaded as at 18.

While I have shown and described my invention in a preferred form, I am aware that various changes and modifications may be made without departing from the principles of the invention, the scope of which is to be determined by the appended claims.

What is claimed is:

1. A strainer comprising an elongated rigid tubular body which is open at one end and closed at the other end and has at least a portion of the length thereof tapered to and smaller at said closed end, the surrounding wall of said tapered portion having openings therethrough distributed substantially throughout the area thereof and arranged in series from end to end thereof, the said tapered portion having a cylindrical opening therein and the wall thereof of progressively increased thickness from the small end thereof to the large end thereof.

2. A strainer comprising an elongated rigid tubular body which is open at one end and closed at the other end and has at least a portion of the length thereof tapered to and smaller at said closed end, the surrounding wall of said tapered portion having a plurality of circumferentially spaced series of slits wherein the slits of each series extend circumferentially and are in side by side relation lengthwise of the tapered portion, means by which the said body is supported and to which it is secured and having a cylindrical opening containing at least a part of said tapered portion of the body centrally therein and providing an annular space around said part and progressively diminishing in cross section in the direction from the closed end of the body to the open end thereof, said body having an external wrench receiving portion and an external threading between said wrench receiving portion and the said tapered portion of the body and said body being secured by the said threading to the said body supporting means.

References Cited in the file of this patent

UNITED STATES PATENTS

| | | |
|---|---|---|
| 427,447 | Thomson | May 6, 1890 |
| 916,340 | Lewis | Mar. 23, 1909 |
| 1,286,297 | Haertel | Dec. 3, 1918 |
| 1,296,542 | McConnell | Mar. 14, 1919 |
| 2,125,445 | Holveck | Aug. 2, 1938 |
| 2,284,135 | Cornelius | May 26, 1942 |
| 2,529,499 | Jankelson | Nov. 14, 1950 |
| 2,681,829 | Wahlin | June 22, 1954 |

FOREIGN PATENTS

| | | |
|---|---|---|
| 373,501 | Italy | July 27, 1939 |